(12) United States Patent
Suzuki (10) Patent No.: US 9,461,484 B2
(45) Date of Patent: Oct. 4, 2016

(54) ELECTRICITY STORAGE SYSTEM, METHOD FOR CONTROLLING SECONDARY BATTERY PACKS, AND SECONDARY BATTERY PACK

(71) Applicant: Shin Suzuki, Kanagawa (JP)

(72) Inventor: Shin Suzuki, Kanagawa (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 2 days.

(21) Appl. No.: 14/374,014

(22) PCT Filed: Nov. 8, 2012

(86) PCT No.: PCT/JP2012/078926
§ 371 (c)(1),
(2) Date: Jul. 23, 2014

(87) PCT Pub. No.: WO2013/114697
PCT Pub. Date: Aug. 8, 2013

(65) Prior Publication Data
US 2015/0035494 A1    Feb. 5, 2015

(30) Foreign Application Priority Data

Jan. 30, 2012 (JP) .................................. 2012-016352

(51) Int. Cl.
*H02J 7/00* (2006.01)
*H01M 10/44* (2006.01)
*H02J 7/35* (2006.01)

(52) U.S. Cl.
CPC .......... *H02J 7/0014* (2013.01); *H01M 10/441* (2013.01); *H02J 7/007* (2013.01); *H02J 7/0013* (2013.01); *H02J 7/0026* (2013.01); *H02J 7/35* (2013.01); *Y02E 10/766* (2013.01)

(58) Field of Classification Search
CPC ...... H02J 7/0014; H02J 7/007; H02J 7/0026; H02J 7/0013; H02J 7/35; H01M 10/441; Y02E 10/766
See application file for complete search history.

(56) References Cited

U.S. PATENT DOCUMENTS 5,603,308 A * 2/1997 Ooyabu ............. H03K 17/0406
123/644
5,773,978 A * 6/1998 Becker ............... G01R 31/3662
324/430

(Continued)

FOREIGN PATENT DOCUMENTS

| CN | 101043143 A | 9/2007 |
|---|---|---|
| JP | 09-215214 A | 8/1997 |

(Continued)

OTHER PUBLICATIONS

International Search Report of PCT/JP2012/078926 dated Feb. 12, 2013.

(Continued)

*Primary Examiner* — Naum B Levin
(74) *Attorney, Agent, or Firm* — Sughrue Mion, PLLC (57) ABSTRACT

In an electricity storage system that has a plurality of secondary battery packs, at the time of switching the object that is to be charged from a first secondary battery pack to a second secondary battery pack that has voltage across terminals lower than that of the first secondary battery pack, by causing a current-limiting circuit of the second secondary battery pack to operate, forms a path for the flow of a charging current for charging secondary batteries that are provided in the second secondary battery pack, and starts charging of the second secondary battery pack while limiting the charging current to a fixed value or less by means of the current-limiting circuit.

6 Claims, 4 Drawing Sheets

(56) References Cited

U.S. PATENT DOCUMENTS

| | | | | |
|---|---|---|---|---|
| 6,373,223 | B1* | 4/2002 | Anzawa | H02J 7/0018 320/116 |
| 6,476,582 | B2* | 11/2002 | Yokokura | H02J 7/0047 320/116 |
| 6,595,194 | B1* | 7/2003 | Ito | F02P 3/0435 123/644 |
| 6,664,762 | B2* | 12/2003 | Kutkut | H02M 3/33561 320/116 |
| 7,339,354 | B2* | 3/2008 | Sanpei | H02J 7/0073 320/129 |
| 7,570,014 | B2* | 8/2009 | Teraoka | H02J 7/0006 320/106 |
| 7,652,450 | B2* | 1/2010 | Aradachi | H02J 7/0072 320/106 |
| 7,733,060 | B2* | 6/2010 | Kojima | H02J 7/0011 320/114 |
| 7,872,443 | B2* | 1/2011 | Ward | H02J 7/35 320/103 |
| 7,888,914 | B2* | 2/2011 | Ng | H02J 7/0057 320/128 |
| 8,013,577 | B2* | 9/2011 | Nishino | H02J 7/0073 320/152 |
| 8,384,351 | B2* | 2/2013 | Monden | H02J 7/0026 320/116 |
| 8,680,814 | B2* | 3/2014 | Kabasawa | H02J 7/0019 320/117 |
| 2001/0005124 | A1* | 6/2001 | Odeohhara | G06F 1/263 320/116 |
| 2005/0212484 | A1 | 9/2005 | Denning et al. | |
| 2006/0082345 | A1* | 4/2006 | Daniel-Ivad | H01M 10/4207 320/134 |
| 2008/0012531 | A1 | 1/2008 | Chang et al. | |
| 2008/0106234 | A1 | 5/2008 | Yun | |
| 2008/0191663 | A1* | 8/2008 | Fowler | B60L 11/185 320/118 |
| 2008/0203966 | A1* | 8/2008 | Ward | H02J 7/355 320/104 |
| 2009/0066291 | A1* | 3/2009 | Tien | H02J 7/0016 320/118 |
| 2010/0164430 | A1* | 7/2010 | Lu | H01M 10/441 320/103 |
| 2011/0001352 | A1* | 1/2011 | Tamura | B60R 16/033 307/9.1 |
| 2011/0050180 | A1* | 3/2011 | Ko | H02J 7/0016 320/162 |
| 2011/0111268 | A1 | 5/2011 | Weng et al. | |
| 2011/0193525 | A1* | 8/2011 | Ro | H02J 7/0016 320/116 |
| 2012/0056587 | A1* | 3/2012 | Iida | H01M 10/441 320/118 |
| 2012/0313439 | A1* | 12/2012 | Yamaguchi | H01M 10/425 307/71 |
| 2013/0002201 | A1* | 1/2013 | Bodkin | H02J 7/0016 320/118 |
| 2013/0119934 | A1* | 5/2013 | Suzuki | B60L 11/1853 320/112 |

FOREIGN PATENT DOCUMENTS

| | | | |
|---|---|---|---|
| JP | 09-308131 A | 11/1997 | |
| JP | 2003-250227 A | 9/2003 | |
| JP | 2005-278395 A | 10/2005 | |
| JP | 2007-259612 A | 10/2007 | |
| JP | 2008-029188 A | 2/2008 | |
| JP | 2008-117743 A | 5/2008 | |
| JP | 2008-263718 A | 10/2008 | |
| JP | 2009-033936 A | 2/2009 | |
| JP | 2011182623 A * | 9/2011 | ............ H02J 7/0016 |
| JP | 2011-254650 A | 12/2011 | |

OTHER PUBLICATIONS

Communication dated Nov. 27, 2015 from the State Intellectual Property Office of the P.R.C. in counterpart application No. 201280066930.6.

* cited by examiner

ELECTRICITY STORAGE SYSTEM, METHOD FOR CONTROLLING SECONDARY BATTERY PACKS, AND SECONDARY BATTERY PACK

CROSS REFERENCE TO RELATED APPLICATIONS

This is a National Stage of International Application No. PCT/JP2012/078926 filed Nov. 8, 2012, claiming priority based on Japanese Patent Application No. 2012-016352 filed Jan. 30, 2012, the contents of all of which are incorporated herein by reference in their entirety.

TECHNICAL FIELD

The present invention relates to an electricity storage system having a plurality of secondary battery packs, the control method of the secondary battery packs, and a secondary battery pack.

BACKGROUND ART

With the increasing concern regarding environmental issues in recent years, electricity storage systems that store electric power generated through the use of natural energy such as solar power generation (PV: Photovoltaic) and wind power generation have been receiving increased attention. The use of lithium ion secondary batteries that do not contain substances such as lead that are hazardous to humans or to the environment is being studied for use in these electricity storage systems.

When an electricity storage system is to be produced using lithium ion secondary batteries (hereinbelow generally referred to as "secondary batteries"), the electricity storage system is typically configured by connecting a plurality of secondary batteries in series to obtain the required output voltage to form a secondary battery pack and then connecting a plurality of secondary battery packs in parallel to obtain the required storage capacity.

However, in a configuration in which a plurality of secondary battery packs (or secondary batteries) are connected in parallel, the concern arises that imbalances of the voltage across the terminals of each of the secondary battery packs during operation will give rise to cross-currents by which current flows between secondary battery packs, rendering the electricity storage system incapable of normal operation. Differences in the state of deterioration of secondary batteries are caused by, for example, the time of manufacture or the temperature of the environment, and if differences occur in the state of deterioration even between secondary batteries of the same type (standard), an imbalance will occur in the voltage across the terminals of each secondary battery after charging and discharging, and this imbalance will bring about the occurrence of cross-currents between secondary batteries. This problem becomes more pronounced as the number of secondary battery packs (or secondary batteries) that are connected in parallel increases.

The adverse influence of cross-currents between secondary battery packs or secondary batteries upon an electricity storage system is generally known, and the mixing of old and new secondary batteries is therefore prohibited in most apparatuses that use a plurality of secondary batteries connected in parallel.

Nevertheless, in actuality, even when only new secondary batteries are used, differences in the progress of deterioration will occur between secondary batteries during operation. There are also many situations in which the combined use of secondary batteries having different states of deterioration is to be desired, such as when an electricity storage system is initially configured using only a few secondary batteries but subsequently secondary batteries are to be added, or when used secondary batteries are employed so that an electricity storage system can be configured inexpensively.

Based on this background, technology is now being sought that enables secondary batteries having different states of deterioration to be safely and freely used in an electricity storage system and thus reduces the risk to users.

As such a technology, Patent Document 1 discloses a technique in which a plurality of secondary battery packs are provided that can be connected in parallel by way of switches and that thus eliminates voltage imbalance across terminals of each secondary battery pack at the time of charging and discharging by controlling the switches that are provided for each secondary battery pack. When each secondary battery pack is to be discharged in the technique disclosed in Patent Document 1, the voltage across the terminals of each secondary battery pack is measured, discharge of voltage across the terminals is started from the secondary battery pack having the highest voltage across terminals whereby the voltage across the terminals decreases due to discharge, and when the voltage across the terminals is substantially equal to that of other secondary battery packs that have not been discharging up to this point, the discharge of the other secondary battery packs is started. When each secondary battery pack is to be charged in the technique disclosed in Patent Document 1, charging is started from the secondary battery pack having the lowest voltage across the terminals whereby the voltage across the terminals increases due to the charging, and when the voltage across the terminals is substantially equal to the voltage across the terminals of other secondary battery packs that have not been charging to this point, the charging of the other secondary battery packs is started. By means of this control, voltage difference across the terminals of each secondary battery pack at the time of starting charging and discharging can be reduced, whereby the occurrence of cross-currents can be prevented.

In the electricity storage system that is described in the above-described Patent Document 1, unless the voltage difference across terminals between a secondary battery pack that is discharging or charging and another secondary battery pack that has been subsequently added and that is to start charging or discharging is within a predetermined value, the discharging or charging cannot start in the other secondary battery pack. As a result, cases will arise in which the electricity storage system cannot be operated with flexibility because it is not possible to individually control each secondary battery pack that is discharged or charged according to, for example, the electric power that is required by the load, the power generation capability of, for example, PV systems, or the residual capacity of each secondary battery pack.

Normally, each secondary battery pack that is provided in an electricity storage system is equipped with a switch for discharging (hereinbelow referred to as the "discharging switch") and a switch for charging (hereinbelow referred to as the "charging switch"), whereby discharging and charging can be performed individually in secondary battery pack units. In an electricity storage system that does not adopt the technique described in Patent Document 1, however, the discharging switch and charging switch of each secondary battery pack must be controlled such that the above-described cross-currents do not occur.

For example, in an electricity storage system that is provided with two secondary battery packs, a case can be considered in which the secondary battery pack that is the object of charging switches from the secondary battery pack having the higher voltage across terminals to the other secondary battery pack having the lower voltage across terminals to charge the other secondary battery pack. In order to prevent cross-currents between the secondary battery packs in this case, the discharging switch and charging switch of one secondary battery pack must each be turned OFF to briefly halt the charging operation of the electricity storage system before starting charging of the other secondary battery pack.

Here, when continuous charging using electric power that is generated by, for example, PV systems or wind power is desired with one secondary battery pack linked to the other secondary battery pack, the electric power that is generated by PV systems or wind power cannot be used for charging at the time that the secondary battery pack that is to be charged is switched, and the power generation capability therefore cannot be used to its full potential.

RELATED ART LITERATURES

Patent Documents

Patent Document 1: Japanese Patent Laid-Open No. 2009-033936

SUMMARY

It is an object of the present invention to provide an electricity storage system, a method of controlling secondary battery packs, and a secondary battery pack that enable safe switching of the secondary battery pack that is to be charged without halting the charging operation.

An exemplary aspect of the electricity storage system of the present invention for achieving the above-described object includes:

a plurality of secondary battery packs that are each provided with secondary batteries, a charging switch that turns a charging current that flows on a charging path of the secondary batteries ON and OFF, a discharging switch that turns the discharging current that flows on the discharging path of the secondary batteries ON and OFF, as well as a current-limiting circuit that is connected in parallel to the charging switch and that limits the charging current to a fixed value or less; and a host device that, when switching a secondary battery pack that is the object of charging from a first secondary battery pack to a second secondary battery pack in which voltage across terminals is lower than that of the first secondary battery pack, causes the current-limiting circuit of the second secondary battery pack to operate to thus form a path on which charging current flows for charging the secondary batteries that are provided in the second secondary battery pack, starts charging of the second secondary battery pack while limiting the charging current to no greater than the fixed value by means of the current-limiting circuit, and turns the discharging switch of the first secondary battery pack OFF.

An exemplary aspect of the method for controlling secondary battery packs of the present invention is a secondary battery pack control method for controlling the charging operation for a plurality of secondary battery packs that are each provided with secondary batteries, a charging switch that turns a charging current that flows on the charging path of the secondary batteries ON and OFF, a discharging switch that turns the discharging current that flows on the discharging path of the secondary batteries ON and OFF, as well as a current-limiting circuit that is connected in parallel to the charging switch and that limits the charging current to a fixed value or less; wherein an information processing device:

when switching a secondary battery pack that is to be charged from a first secondary battery pack to a second secondary battery pack in which the voltage across terminals is lower than that of the first secondary battery pack, causes the current-limiting circuit of the second secondary battery pack to operate to thus form a path on which charging current flows for charging secondary batteries that are provided in the second secondary battery pack, starts charging of the second secondary battery pack while limiting the charging current to the fixed value or less by means of the current-limiting circuit, and turns the discharging switch of the first secondary battery pack OFF.

Finally, An exemplary aspect of the secondary battery pack of the present invention includes:

secondary batteries;

a charging switch that turns a charging current that flows on the charging path of the secondary batteries ON and OFF;

a discharging switch that turns the discharging current that flows on the discharging path of the secondary batteries ON and OFF;

a current-limiting circuit that is connected in parallel with the charging switch and that limits the charging current to a fixed value or less; and a control unit that controls the charging switch, the discharging switch, and the current-limiting circuit in accordance with instructions from the outside.

EXEMPLARY EMBODIMENT

The present invention is next described with reference to the accompanying drawings.

Figure 1:
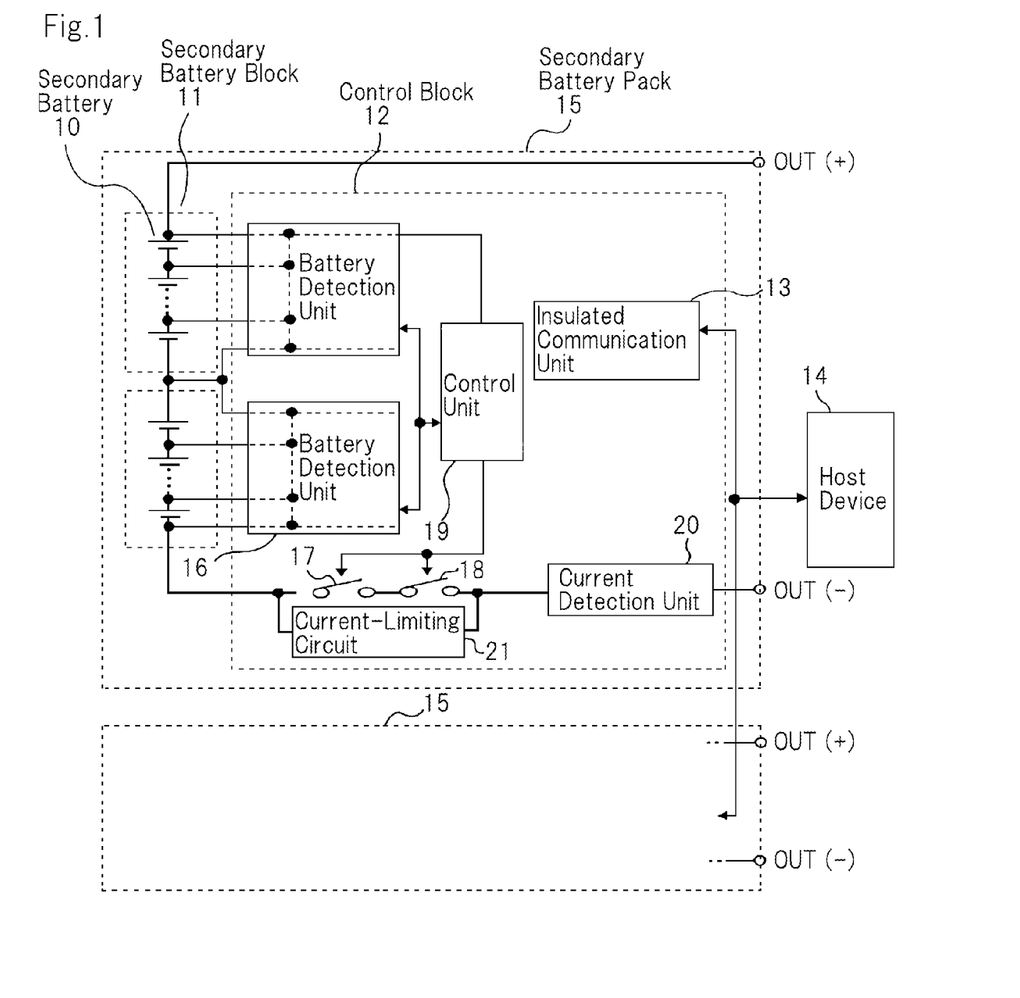
FIG. 1 is a block diagram showing an example of the configuration of the electricity storage system of the present invention.

FIG. 1 is a block diagram showing an example of the configuration of the electricity storage system of the present invention.

As shown in FIG. 1, the electricity storage system of the present invention includes two secondary battery packs 15 that are connected in parallel and host device 14 that controls these secondary battery packs 15. At the time of discharging the electricity storage system, the load (not shown) of, for example, an electric apparatus that consumes the electric power that is discharged from secondary battery packs 15 is connected to the positive terminal (OUT (+)) and negative terminal (OUT (−)) of each secondary battery pack 15. At the time of charging the electricity storage system, an electric power supply source (not shown) that supplies electric power that is necessary for charging secondary battery packs 15 is connected to the positive terminal (OUT (+)) and negative terminal (OUT (−)) of each secondary battery pack 15. Electric power supply sources include PV or wind power generation or a commercial power source. A known PCS (Power Conditioning System) that includes, for example, a DC/AC inverter that converts the direct-current power that is discharged from secondary battery packs 15 to alternating-current power or an AC/DC converter that converts the alternating-current power supplied from an electric power supply source to direct-current power that can be stored in secondary battery packs 15 may be provided between secondary battery packs 15 and the load or the electric power supply source. The switching of the connection of the load or the electric power supply source to the electricity storage system is controlled by, for example, host device 14.

Secondary battery packs 15 are each provided with two secondary battery blocks 11 and control block 12. Secondary battery blocks 11 are constructions that are each provided with, for example, a plurality of secondary batteries 10 that are connected in series. Control blocks 12 are each provided with control unit 19, battery detection unit 16, current detection unit 20, discharging switch 17, charging switch 18, insulated communication unit 13, and current-limiting circuit 21.

Discharging switch 17 is a switch that turns the current (discharging current) that flows on the discharging path of secondary battery block 11 ON and OFF, and charging switch 18 is a switch that turns the current (charging current) that flows on the charging path of secondary battery block 11 ON and OFF. As one example, MOSFETs (Metal-Oxide Semiconductor Field-Effect Transistors) are used in discharging switch 17 and charging switch 18. Turning discharging switch 17 and charging switch 18 ON and OFF is controlled by control unit 19 in accordance with instructions from the host device.

Insulated communication unit 13 is an interface circuit that connects control unit 19 and host device 14 so as to enable the transmission and reception of information. As long as it is capable of connecting control unit 19 and host device 14 so as to allow the transmission and reception of information while electrically insulating control unit 19 and host device 14, insulated communication unit 13 may be a configuration that uses any type of known insulating elements such as optical coupling, magnetic coupling, and capacitive coupling.

Battery detection unit 16 measures the voltage across terminals of each secondary battery 10 that is provided in secondary battery blocks 11.

Current detection unit 20 measures the discharging current and charging current of secondary battery packs 15 and reports the measurement results to control unit 19.

Current-limiting circuit 21 is a circuit or element that limits the charging current that flows to secondary battery blocks 11 to a fixed value or less. Current-limiting circuit 21 has a configuration that is provided with switches (not shown) and that, by the turning switches ON and OFF, by control unit 19 in accordance with instructions from host device 14, is capable of the turning the current-limiting operation during charging ON/OFF. Current-limiting circuit 21 is connected in parallel with at least charging switch 18. FIG. 1 shows an example of a configuration in which current-limiting circuit 21 is connected in parallel to discharging switch 17 and charging switch 18 that are connected in series.

Control unit 19 controls the operation of battery detection unit 16, current detection unit 20, discharging switch 17, charging switch 18, and current-limiting circuit 21 in accordance with the instructions of host device 14. Control unit 19 turns discharging switch 17 ON when, for example, secondary battery blocks 11 are to be discharged and turns charging switch 18 ON when secondary battery blocks 11 are to be charged. In addition, control unit 19 reports to host device 14 the voltage across terminals of each secondary battery 10 and the voltage across terminals of secondary battery packs 15 that were measured in battery detection unit 16 in accordance with the instructions of host device 14. The voltage across terminals of secondary battery packs 15 may be found by adding up the voltage across terminals for each secondary battery 10. In addition, control unit 19 reports to host device 14 the discharging current or charging current that was measured in current detection unit 20 in accordance with instructions from host device 14. Battery detection unit 16, current detection unit 20, and control unit 19 can be realized by known ICs (Integrated Circuits) for monitoring (protecting) secondary batteries that are provided with the above-described functions.

Host device 14 controls the overall operation of the electricity storage system by communicating with control unit 19 that is provided in secondary battery packs 15. The functioning of host device 14 can be realized by a known information processing device (a computer or an IC for information processing) that is provided with, for example, a CPU, memory, and various types of logic circuits, in which case the functioning of host device 14 can be realized as the electricity storage system of the present invention to be described by executing processing in accordance with a program that has been recorded on a recording medium (not shown). The recording medium may be a known medium such as a magnetic disk, an optical disk, or a semiconductor memory.

FIG. 1 shows an example of a configuration in which the electricity storage system is provided with two secondary battery packs 15, each secondary battery pack 15 being provided with two secondary battery blocks 11, but the electricity storage system may also be provided with three or more secondary battery packs 15, and each secondary battery pack 15 may be provided with one or three or more secondary battery blocks 11. Each secondary battery pack 15 and secondary battery block 11 may have the same configuration, or may have a different configuration.

Figure 2:
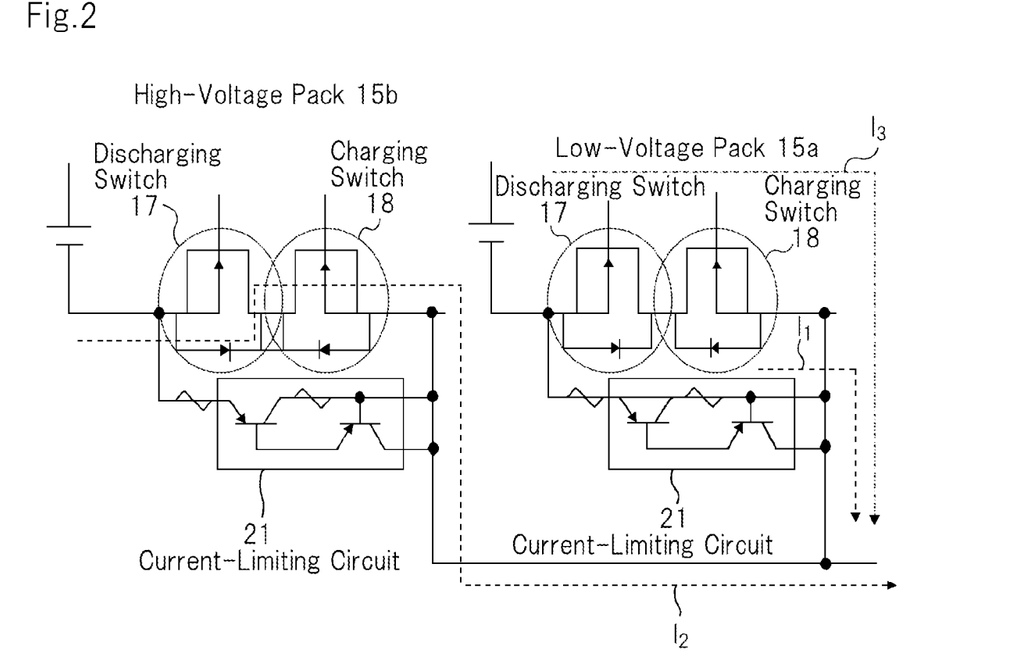
FIG. 2 is a circuit diagram showing an example of the operation of the electricity storage system shown in FIG. 1.

FIG. 2 is a circuit diagram showing an example of the operation of the electricity storage system shown in FIG. 1.

FIG. 2 shows the state of the charging current that flows to low-voltage pack 15a and high-voltage pack 15b when secondary battery pack 15 that is to be charged is switched from secondary battery pack 15 in which the voltage across terminals is higher (high-voltage pack 15b) than the other secondary battery pack 15 in which the voltage across terminals is lower (low-voltage pack 15a). FIG. 2 shows only discharging switches 17, charging switches 18, and current-limiting circuits 21 of two secondary battery packs 15 (low-voltage pack 15a and high-voltage pack 15b). It is assumed here that discharging switch 17 and charging switch 18 of low-voltage pack 15a have both turned OFF before secondary battery pack 15, that is being charged, is switched.

In the electricity storage system of the present exemplary embodiment, when, for example, secondary battery pack 15 that is to be charged is switched from high-voltage pack 15b to low-voltage pack 15a and this low-voltage pack 15a is charged, host device 14 first turns current-limiting circuit 21 of low-voltage pack 15a ON. At this time, the path for charging secondary battery block 11 in low-voltage pack 15a (the path through which charging current ($I_1$) flows in FIG. 2) is formed by current-limiting circuit 21 that is connected in parallel to discharging switch 17 and charging switch 18. Because the voltage across terminals is higher in high-voltage pack 15b than in low-voltage pack 15a as previously described, the charging current is supplied to low-voltage pack 15a not only from the current supply source but also from high-voltage pack 15b when the difference in the voltage across terminals is of a certain level. However, the charging current that flows to low-voltage pack 15a is controlled to a fixed value or less by current-limiting circuit 21.

Host device 14 next turns discharging switch 17 of high-voltage pack 15b OFF. At this time, the charging current ($I_2$ in FIG. 2) in high-voltage pack 15b flows by way of parasitic diodes that are provided in discharging switch (MOSFET) 17 of high-voltage pack 15b. In addition, because the charging current ($I_1$ in FIG. 2) is also flowing to low-voltage pack 15a, the charging current that is being supplied from the electric power supply source is dispersed to low-voltage pack 15a and high-voltage pack 15b. Accordingly, a large charging current does not flow to parasitic diodes provided in discharging switch (MOSFET) 17 of high-voltage pack 15b. As a result, discharging switch (MOSFET) 17 of high-voltage pack 15b does not cause abnormal heat generation.

Next, host device 14 both turns charging switch 18 of low-voltage pack 15a ON and turns charging switch 18 of high-voltage pack 15b OFF. At this time, discharging switch 17 may also be turned ON in low-voltage pack 15a. In the configuration shown in FIG. 2, additionally turning discharging switch 17 of low-voltage pack 15a ON is preferable from the standpoint of preventing abnormal heat generation of discharging switch 17. Host device 14 subsequently turns current-limiting circuit 21 of low-voltage pack 15a OFF to halt the current-limiting operation by current-limiting circuit 21. At this stage, secondary battery pack 15 that is to be charged switches from high-voltage pack 15b to low-voltage pack 15a, following which the charging current ($I_3$ in FIG. 2) flows by way of charging switch 18 (charging switch 18 and discharging switch 17 in the configuration shown in FIG. 2) of low-voltage pack 15a.

According to the present exemplary embodiment, charging is started while limiting the charging current that flows to secondary battery pack 15 that has the lower voltage across terminals (low-voltage pack 15a) to a fixed value or less, discharging switch 17 and charging switch 18 of the secondary battery pack 15 that has the higher voltage across terminals (high-voltage pack 15b) are successively turned OFF, and charging switch 18 of low-voltage pack 15a is turned ON, following which the current-limiting operation by current-limiting circuit 21 of low-voltage pack 15a is halted, whereby there is no need to halt the charging operation of the electricity storage system at the time of switching secondary battery pack 15 that is the object of charging. Accordingly, there is no waste of the electric power that is generated by PV systems or wind power. In addition, limiting the charging current of low-voltage pack 15a to no greater than a fixed value at the time of switching secondary battery pack 15 that is the object of charging prevents the flow of excess charging current from high-voltage pack 15b to low-voltage pack 15a or the abnormal generation of heat by the MOSFET used as discharging switch 17. As a result, secondary battery pack 15 that is to be charged can be safely switched without halting the charging operation.

Figure 3:
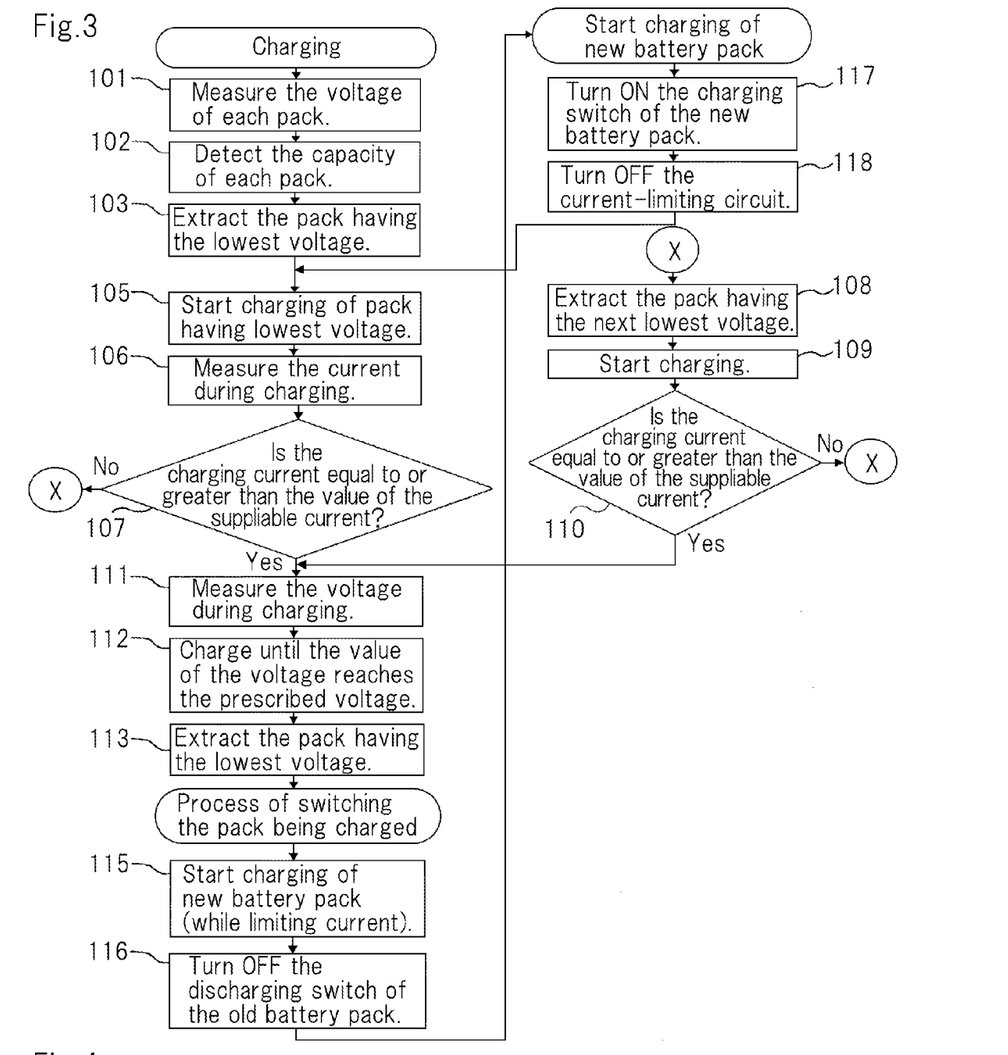
FIG. 3 is a flow chart showing an example of the processing procedure of the host device shown in FIG. 1.

FIG. 3 is a flow chart showing an example of the processing procedure of the host device shown in FIG. 1.

FIG. 1 and FIG. 2 show examples of a configuration in which the electricity storage system is provided with two secondary battery packs 15, and FIG. 3 shows an example of the operation when the electricity storage system is provided with three or more secondary battery packs 15. In addition, FIG. 3 shows an example of processing that, by increasing the number of secondary battery packs 15 that are to be charged, causes operation that does not waste the electric power that is generated at the electric power supply source when the charging current of secondary battery packs 15 is lower than the suppliable current that can be supplied from an electric power supply source such as PV systems or wind power generators.

As shown in FIG. 3, in a state when secondary battery packs 15 are not being charged or discharged, host device 14 causes control unit 19 to cause, for example, battery detection unit 16 to measure the voltage across terminals (pack voltage) of secondary battery packs 15 and report the pack voltage (Step 101).

Host device 14 next, based on the voltage across terminals (pack voltage) that was reported from each secondary battery pack 15, finds the residual capacity (pack capacity) of each secondary battery pack 15 (Step 102), and detects secondary battery pack 15 having the least residual capacity, i.e., secondary battery pack (lowest-voltage pack) 15 in which the voltage across terminals is the lowest (Step 103). The residual capacity of secondary battery packs 15 can be found by, for example, preparing in advance a table that shows the relation between the voltage across terminals and the residual capacity of secondary battery packs 15 and then finding the residual capacity by referring to this table based on the measured value of the voltage across terminals.

Host device 14 next starts charging the lowest-voltage pack that was detected in Step 103 (Step 105).

Host device 14 then, by means of control unit 19, uses current detection unit 20 to measure the charging current of secondary battery pack 15 that is being charged (Step 106) and reports the current value.

Host device 14 compares the value of the charging current that was reported from secondary battery pack 15 that is being charged with the value of the suppliable current that can be supplied from the electric power supply source (Step 107). The value of the suppliable current of the electric power supply source should be reported from, for example, a PCS (Power Conditioning System) that is provided in a PV system or wind power generator.

When the value of the charging current is lower than the value of the suppliable current, host device 14 detects secondary battery pack (the lowest voltage pack) 15 that has the next lowest voltage across terminals (Step 108) and starts charging of the secondary battery pack 15 (Step 109).

Host device 14 again compares the value (total value) of the charging current that was reported from each secondary battery pack 15 that is being charged with the value of the suppliable current (Step 110), and if the value of the charging current (total value) is lower than the value of the suppliable current, returns to Step 108 to further add and charge secondary battery pack 15 that has the next lowest voltage across terminals.

If the value (total value) of charging current is equal to or greater than the value of the suppliable current in Step 107 and Step 110, host device 14 charges secondary battery packs 15 until the value of the voltage across terminals equals a prescribed voltage that was set in advance (Step 112) while monitoring the measured value of the voltage across terminals of secondary battery packs 15 that are being charged (Step 111). The prescribed voltage is the voltage across terminals at which the operation of charging secondary battery packs 15 is halted and may be set to any value as long as it is less than or equal to the voltage across terminals at which secondary battery packs 15 are fully charged.

When the voltage across terminals of secondary battery pack 15 that is being charged reaches the prescribed voltage, host device 14 detects secondary battery pack 15 whose voltage across terminals is lowest (Step 113) and begins the process of switching secondary battery pack 15 that is the object of charging.

At the time of switching secondary battery packs 15, host device 14 uses current-limiting circuit 21 to start charging secondary battery pack 15 whose voltage across terminals is lowest (hereinbelow referred to as the "new battery pack") while limiting the charging current to a fixed value or less (Step 115). Host device 14 next turns OFF discharging switch 17 of secondary battery pack 15 that is being charged and that was being charged up to this point (hereinbelow referred to as "old battery pack") (Step 116). Host device 14 further turns charging switch 18 of the new battery pack (Step 117) ON and then turns current-limiting circuit 21 of the new battery pack OFF to halt the current-limiting operation (Step 118). Host device 14 subsequently returns to Step 105 and repeats the processes of Step 105-Step 118.

If the value of the charging current (total value) is equal to or greater than the value of the suppliable current, host device 14 transitions to the processes that follow Step 111 while charging a plurality of secondary battery packs 15 in parallel.

In the explanation above, a case was shown in which charging of secondary battery packs 15 that are being charged is continued until the voltage across terminals of these secondary battery packs 15 equals a prescribed voltage that was set in advance, but the charging operation of secondary battery packs 15 may also be halted before the voltage across terminals reaches the prescribed voltage.

For example, when secondary battery pack 15 is being charged at a fixed charging voltage that has been set in advance, the charged state of secondary battery pack 15 can be divided between a CC (Constant Current) region in which the voltage across terminals is sufficiently lower than the above-described charging voltage and the voltage across terminals rises substantially in proportion to the passage of time, and a CV (Constant Voltage) region in which the voltage across terminals is close to the above-described charging voltage and the voltage across terminals rises slowly and reaches the above-described charging voltage slowly.

Host device 14 monitors the voltage across terminals of secondary battery pack 15 that is being charged and, based on the value of the voltage across terminals, may switch secondary battery pack 15 that is to be charged to a new battery pack at the point in time that secondary battery pack 15 that is being charged is judged to reach the above-described CV region. Of course, secondary battery pack 15 that is to be charged may also be switched to a new battery pack even when secondary battery pack 15 that is being charged has not reached the above-described CV region. By thus switching secondary battery pack 15 that is to be charged to a new battery pack at the point in time that secondary battery pack 15 that is being charged reaches the CV region, the charging time of secondary battery packs 15 can be shortened. Whether secondary battery pack 15 that is being charged is in the CC region or in the CV region can be determined by the voltage across terminals as described above, and whether the CV region has been reached should be judged based on a value (voltage across terminals) that is set by the manufacturer or vender of secondary battery packs 15.

Figure 4:
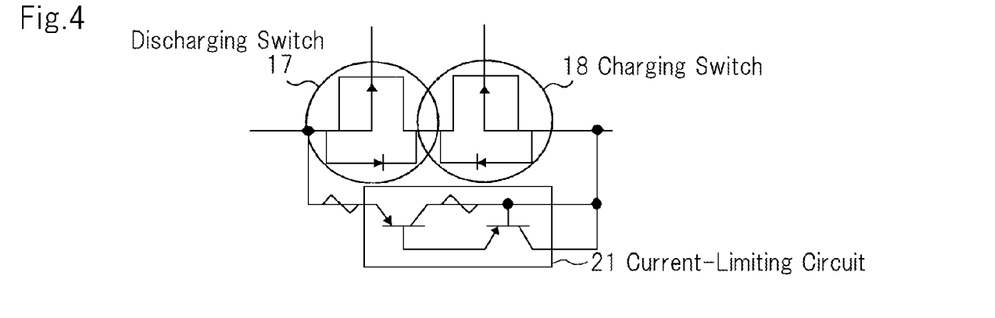
FIG. 4 is a circuit diagram showing an example of the configuration of the discharging switch, the charging switch, and the current-limiting circuit shown in FIG. 1.

FIG. 4 is a circuit diagram showing an example of the configuration of the discharging switch, charging switch, and current-limiting circuit shown in FIG. 1.

The circuit shown in FIG. 4 is an example in which MOSFETs are used as discharging switch 17 and charging switch 18 and these switches are connected in series. A constant-current circuit is used in current-limiting circuit 21. The constant-current circuit has a configuration that includes, for example, a first bipolar transistor that is inserted into the path on which current flows and a second bipolar transistor that detects the current that flows in the first bipolar transistor and controls the current to be no greater than a fixed value. In the circuit shown in FIG. 4, the charging current of secondary battery blocks 11 can be limited to a fixed value or less by means of the constant-current circuit.

Figure 5:
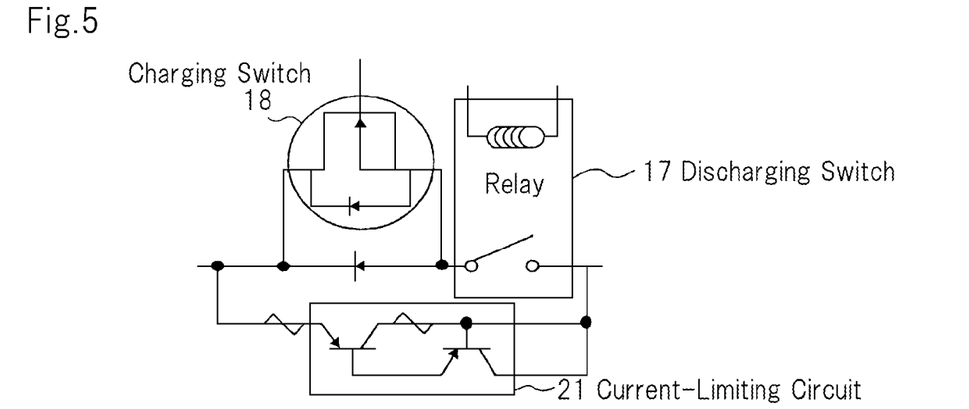
FIG. 5 is a circuit diagram showing another example of the configuration of the discharging switch, the charging switch, and the current-limiting circuit shown in FIG. 1.

FIG. 5 is a circuit diagram showing another example of the configuration of the discharging switch, charging switch, and current-limiting circuit shown in FIG. 1.

The circuit shown in FIG. 5 is an example that employs a MOSFET as charging switch 18 and that uses a relay as discharging switch 17. Current-limiting circuit 21 is made up of a constant-current circuit that is provided with two bipolar transistors similar to the circuit shown in FIG. 4. The circuit shown in FIG. 5 is also able to limit the charging current of secondary battery blocks 11 to a fixed value or less by means of a constant-current circuit.

Figure 6:
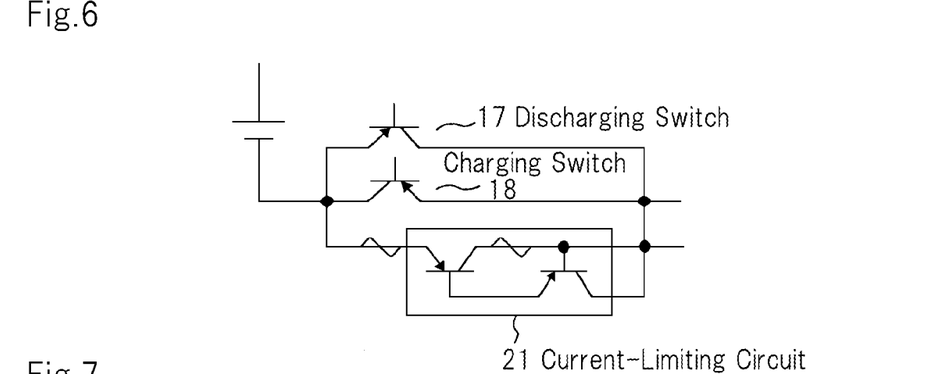
FIG. 6 is a circuit diagram showing another example of the configuration of the discharging switch, the charging switch, and the current-limiting circuit shown in FIG. 1.

FIG. 6 is a circuit diagram showing another example of the configuration of the discharging switch, charging switch, and current-limiting circuit shown in FIG. 1.

The circuit shown in FIG. 6 is an example in which discharging switch 17 and charging switch 18 are made up of bipolar transistors, these transistors being connected in parallel. In the circuit shown in FIG. 6, PNP transistors are used as discharging switch 17 and charging switch 18, the emitter of the transistor that is used as discharging switch 17 being connected to the negative electrode of a secondary battery and the collector of the transistor that is used as charging switch 18 being connected to the negative electrode of a secondary battery to determine the direction of the discharging current or the charging current. NPN transistors may also be used for discharging switch 17 and charging switch 18. In this case, the collector of the transistor that is used as discharging switch 17 should be connected to the negative electrode of the secondary battery, and the emitter of the transistor that is used as charging switch 18 should be connected to the negative electrode of the secondary battery. Current-limiting circuit 21 is composed of a constant-current circuit that is provided with two bipolar transistors similar to the circuit shown in FIG. 4. In the circuit shown in FIG. 6 as well, the charging current of secondary battery blocks 11 can be limited to a fixed value or less by means of the constant-current circuit.

Figure 7:
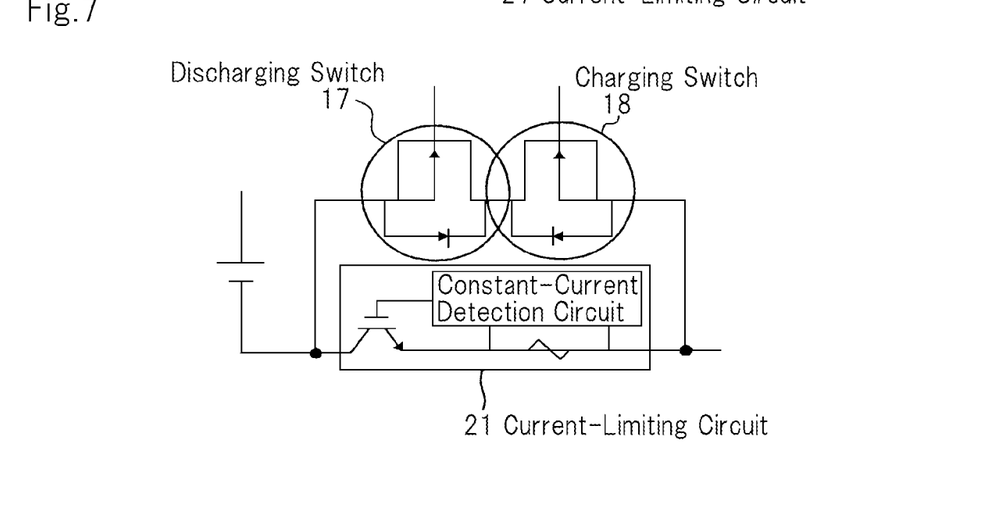
FIG. 7 is a circuit diagram showing another example of the configuration of the discharging switch, the charging switch, and the current-limiting circuit shown in FIG. 1.

FIG. 7 is a circuit diagram showing another example of the configuration of the discharging switch, charging switch, and current-limiting circuit shown in FIG. 1.

In the circuit shown in FIG. 7, discharging switch 17 and charging switch 18 are composed of MOSFETs similar to the circuit shown in FIG. 4. Current-limiting circuit 21 is a configuration provided with an IGBT (Insulated Gate Bipolar Transistor) that is a high-breakdown voltage element and a constant-current detection circuit and limits the current that flows in the IGBT to no greater than a fixed value by detection by means of the constant-current circuit. Current-limiting circuit 21 shown in FIG. 7 can be applied to secondary battery packs 15 in which the charging/discharging voltage is high and can limit the charging current of secondary battery blocks 11 to a fixed value or less.

According to the present exemplary embodiment, secondary battery pack 15 that is to be charged is switched while limiting the charging current that flows to secondary battery pack 15 that has a low voltage across its terminals to no greater than a fixed value by means of current-limiting circuit 21, whereby there is no need to halt the charging operation of the electricity storage system at the time of switching. Accordingly, there is no waste of the electric power that is generated by, for example, PV systems or wind power. In addition, limiting the charging current to no greater than a fixed value prevents both the flow of excess charging current from secondary battery pack 15 in which the voltage across terminals is high to secondary battery pack 15 in which the voltage across terminals is low and abnormal generation of heat by the MOSFET that is used as discharging switch 17. As a result, secondary battery pack 15 that is to be charged can be safely switched.

A working example of the electricity storage system of the present invention is next described.

It is assumed that, for example, the difference in residual capacity of two secondary battery packs 15 shown in FIG. 1 is 30%, and the voltage across terminals of each of secondary battery packs 15 at this time is 4.2 V and 3.7 V It is further assumed that secondary battery blocks 11 have a configuration in which 50 secondary batteries 10 are connected in series, and secondary battery packs 15 are used that are provided with a total of 100 secondary batteries 10 connected in series.

The voltage difference of secondary batteries 10 when the difference in residual capacity is 30% is (4.2 V−3.7 V)=0.5 V. One hundred secondary batteries 10 are connected in series, and the voltage difference of secondary battery pack 15 is therefore 0.5×100=50 V. If the prescribed resistance of secondary battery pack 15 is 40 mΩ, direct connection of two secondary battery packs 15 results in a current of 1250 A that flows between secondary battery packs 15.

On the other hand, if the capacity of secondary battery pack 15 is 30 Ah and the maximum charging current is 90 A (3C), then the charging current that flows between secondary battery packs 15 at the time of switching the object that is to be charged must be limited to no more than 90 A. In this case, current-limiting circuit 21 should employ a circuit that limits current to no more than, for example, 80 A.

A case is further considered in which operating an electricity storage system of 100 KWh is realized by connecting a plurality of secondary battery packs 15 in parallel. The voltage across terminals of each secondary battery pack 15 is assumed to be in the order of 400 V-600 V. If the average value of the voltage across terminals of each secondary battery pack 15 is here assumed to be 370 V, the capacity that is required of the electricity storage system is 100 KWh/370 V=270 Ah. Accordingly, assuming that the capacity of each secondary battery pack 15 is 30 Ah, the electricity storage system should be made up of nine (270 Ah/30 Ah=9) secondary battery packs 15 connected in parallel.

In an electricity storage system that is provided with a plurality of secondary battery packs 15 of this type, secondary battery packs 15 can be individually detached and exchanged and secondary battery packs 15 can be additionally installed.

Although the invention of the present application has been described with reference to exemplary embodiments, the invention of the present application is not limited to the above-described exemplary embodiments. The configuration and details of the invention of the present application are open to various modifications within the scope of the invention of the present application that will be clear to one of ordinary skill in the art.

The invention claimed is:

1. An electricity storage system comprising:
    a plurality of secondary battery packs that are connected in parallel, and that are each provided with secondary batteries, a charging switch that turns a charging current that flows on a charging path of said secondary batteries ON and OFF, a discharging switch that turns a discharging current that flows on a discharging path of said secondary batteries ON and OFF, as well as a current-limiting circuit that is connected in parallel to said charging switch and that limits said charging current to a fixed value or less; and
    a host device that, when switching a secondary battery pack that is to be charged from a first secondary battery pack to a second secondary battery pack in which voltage across terminals is lower than that of the first secondary battery pack, by causing said current-limiting circuit of said second secondary battery pack to operate, forms a path on which charging current flows for charging secondary batteries that are provided in said second secondary battery pack, starts charging of said second secondary battery pack while limiting said charging current to said fixed value or less by means of said current-limiting circuit, and turns the discharging switch of said first secondary battery pack OFF.

2. The electricity storage system according to claim 1, wherein said host device:
    after turning the discharging switch of said first secondary battery pack OFF, turns the charging switch of said second secondary battery pack ON, turns the charging switch of said first secondary battery pack OFF, and then halts the current-limiting operation by said current-limiting circuit of said second secondary battery pack.

3. The electricity storage system according to claim 1, wherein said host device:
    when the charged state of said first secondary battery pack reaches a constant voltage (CV) region, switches the secondary battery pack that is to be charged from said first secondary battery pack to said second secondary battery pack.

4. A method of controlling secondary battery packs to control a charging operation for a plurality of secondary battery packs that are connected in parallel, and that are each provided with: secondary batteries, a charging switch that turns a charging current that flows on a charging path of said secondary batteries ON and OFF, a discharging switch that turns a discharging current that flows on a discharging path of said secondary batteries ON and OFF, as well as a current-limiting circuit that is connected in parallel to said charging switch and that limits said charging current to a fixed value or less; wherein a host device:
    when switching a secondary battery pack that is to be charged from a first secondary battery pack to a second secondary battery pack in which the voltage across terminals is lower than that of said first secondary battery pack, by causing said current-limiting circuit of said second secondary battery pack to operate, forms a path on which charging current flows for charging secondary batteries that are provided in said second secondary battery pack, starts charging said second secondary battery pack while limiting said charging current to said fixed value or less by means of said current-limiting circuit, and turns the discharging switch of said first secondary battery pack OFF.

5. The secondary battery pack control method according to claim 4, wherein said host device:

after turning the discharging switch of said first secondary battery pack OFF, turns the charging switch of said second secondary battery pack ON, turns the charging switch of said first secondary battery pack OFF, and then halts the current-limiting operation by said current-limiting circuit of said second secondary battery pack.

6. The secondary battery pack control method according to claim 4, wherein said host device:

when the charged state of said first secondary battery pack reaches a constant voltage (CV) region, switches the secondary battery pack that is to be charged from said first secondary battery pack to said second secondary battery pack.

* * * * *